A. R. EARNSHAW.
JOINT AND METHOD OF FORMING THE SAME.
APPLICATION FILED JULY 21, 1920.
1,412,556.
Patented Apr. 11, 1922.
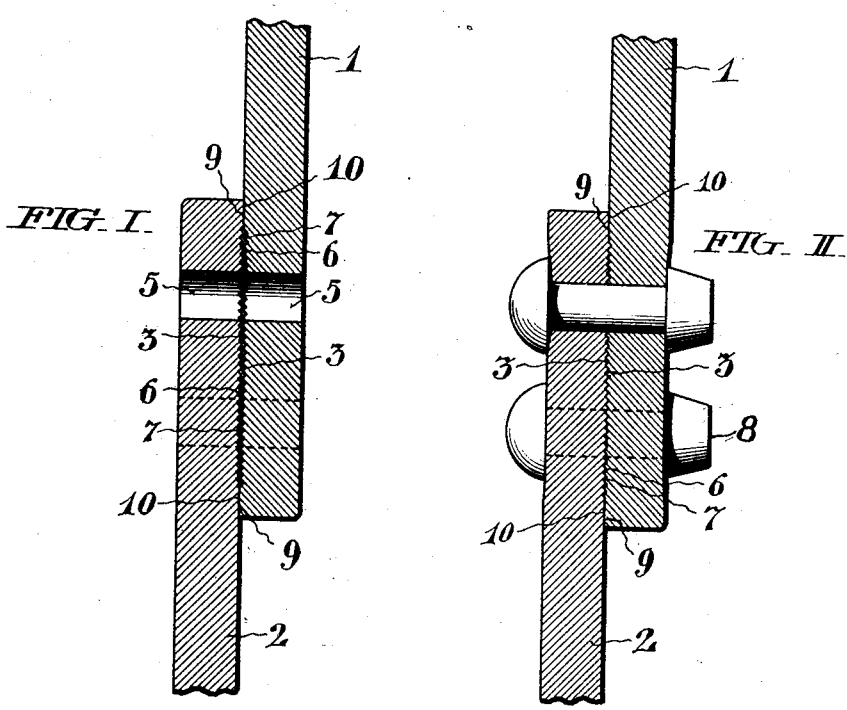
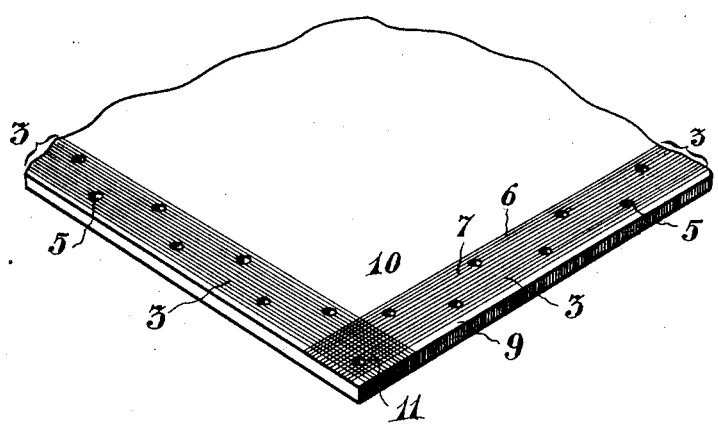
WITNESSES:
John C. Bergner
James H. Bell
INVENTOR:
Arthur R. Earnshaw,
BY Haley & Paul
ATTORNEYS.

UNITED STATES PATENT OFFICE.

ARTHUR R. EARNSHAW, OF RIVERTON, NEW JERSEY.

JOINT AND METHOD OF FORMING THE SAME.

1,412,556.

Specification of Letters Patent.  Patented Apr. 11, 1922.

Application filed July 21, 1920. Serial No. 397,909.

*To all whom it may concern:*

Be it known that I, ARTHUR R. EARNSHAW, a citizen of the United States, residing in Riverton, in the county of Burlington and State of New Jersey, have invented certain new and useful Improvements in Joints and Methods of Forming the Same, whereof the following is a specification, reference being had to the accompanying drawings.

My invention relates to joints between metal plates and the like, and especially to joints of the type in which overlapping portions of the metal plates or members to be united are fastened together by securing members such as rivets or bolts extending through registering rivet-holes in them. Such joints are used for steam boilers, metal tanks, steel ships, and in a great variety of other structures. A principal object of my invention is to secure greater strength and tightness in such joints in a relatively simple and inexpensive manner. I have hereinafter described in detail the best mode of carrying out the invention at present known to me, indicating its scope and essentials in my claims.

In the drawings, Fig. I shows a section through plates ready to be riveted together to form a joint constructed in accordance with my invention.

Fig. II is a similar view of the completed joint after riveting up.

Fig. III is a perspective view, on a reduced scale, of a plate prepared for joining in accordance with my invention.

From Figs. I, II, and III, it will be seen that the joint shown comprises two metal plates 1 and 2 abutting along reciprocally corresponding marginal facial joint zones 3, 3. These facial joint zones 3, 3 are pierced with corresponding longitudinally-extending series of rivet-holes 5, 5,—here indicated as lying in two rows and staggered in alternation. In the region of the rivet-holes 5, 5, each of the joint zones 3, 3 has a multiplicity of relatively fine longitudinally-extending grooves 6 separated by similarly fine intervening ridges 7 which correspond in shape and location, to the grooves 6 of the other plate, so that when the plates are clamped together by the rivets 8, the grooves and ridges of the two plates engage and interlock (as shown in Fig. II) in such wise as to give the joint as a whole great tensile strength,—irrespective of the shearing strength of the rivets 8 themselves. As shown, the grooves and ridges 6 and 7 are of identical V-shaped cross section on each plate and on the two plates,—just like ordinary intermeshing screw-threads,—so that the joint zones of the two plates are substantial counterparts of one another. Between its facial joint zone 3 and its outer edge, each plate, it will be seen, has a relatively narrow plain zone 9 where the original facial surface of the plate remains undeformed; this registers with the plain surface 10 of the other plate inside its joint zone 3 and permits free flow of the metal at the plate edge in calking.

While the grooved and ridged surfaces of the joint zones 3, 3 might be formed with the ridges 7 initially outstanding more or less beyond the adjacent ungrooved plate surfaces, so as to engage and interlock as shown in Fig. II on mere superposition of the plates 1 and 2 in assembling, I ordinarily prefer to form the grooves 6 (by machining or rolling of the plates) in such a manner that the ridges 7 of both plates shall originally lie wholly below these ungrooved plate surfaces, as clearly shown in Fig. I, and only engage and interlock when the plates are clamped tightly together in riveting or in bolting up. This has the advantage of permitting the plates 1 and 2 to be readily and freely shifted and moved over one another, in assembling, without interference from their grooves and ridges.

It will further be seen that while proper registration and interlocking of the grooves and ridges 6 and 7 of the joint zones 3, 3 greatly augments the tensile strength of the joint and largely relieves the rivets 8 of shearing stress, failure of these grooves and ridges to interlock still leaves the joint with substantially the strength of an ordinary one. This is so because the depth of the grooves 6 need be but very slight (not over some $\frac{1}{16}''$ or $\frac{1}{32}''$ or less, for example) owing to the relatively large width available for the joint zones 3, 3, and because the plates will still be in contact over a large area in the joint zones, whose ridges 7 may even bite into one another somewhat when the joint is riveted up under such conditions. In any case, moreover, the grooves 6, 6 can be made to contribute to the tightness of the joint, by virtue of their capacity for holding a filler (such as red or white lead) applied before the plates are secured together.

From Fig. III, it will be seen that at the corners of a plate its joint zones 3, 3 may simply be extended out to the edges across one another, so that the corner portion 11 presents a multitude of pyramidal projections formed and separated by the intersecting angular grooves 6, 6.

Having thus described my invention, I claim:

1. A joint comprising overlapping plates abutting along reciprocally corresponding facial joint zones, the joint zone of each plate being pierced with a series of rivet-holes extending lengthwise thereof in correspondence with those of the other plate and having a multiplicity of fine longitudinally-extending parallel grooves separated by intervening ridges corresponding in shape and location to the grooves in the other plate; in combination with securing members extending through the rivet-holes of the abutting zones and clamping their corresponding grooves and ridges into interlocking engagement.

2. A joint comprising overlapping plates abutting along reciprocally corresponding facial joint zones, the joint zone of each plate being pierced with a series of rivet-holes extending lengthwise thereof in correspondence with those of the other plate and having a multiplicity of longitudinally-extending parallel grooves separated by intervening ridges corresponding in shape and location to the grooves in the other plate and originally lying wholly below the adjacent ungrooved plate surfaces, so as not to interfere with relative shifting of the plates to bring their rivet-holes into registry in assembling; in combination with securing members extending through the rivet-holes of the abutting zones and clamping their corresponding grooves and ridges into interlocking engagement.

3. As an article of manufacture, a plate with a longitudinally grooved facial joint zone pierced by a series of rivet-holes extending lengthwise thereof and having a multiplicity of parallel longitudinal ridges formed and separated by its grooves and lying wholly below the adjacent ungrooved plate surfaces; so that in assemblage of said plate with another having a corresponding facial joint zone, the plates may be freely shifted relatively to one another to bring their rivet-holes into registry without interference from their grooves and ridges.

4. As an article of manufacture, a plate with a marginal longitudinally grooved facial joint zone, said joint zone being pierced by a series of rivet-holes extending lengthwise thereof and having a multiplicity of parallel longitudinal ridges formed and separated by its grooves, with a plain zone between the plate edge and said joint zone.

5. The method of forming an interlocked plate joint, which consists in providing the plates to be joined with corresponding facial joint zones grooved in the region and direction of their rivet-holes and having parallel ridges between their grooves lying wholly below the adjacent ungrooved plate surfaces; assembling the plates with their rivet-holes in registry; and bringing the grooves and ridges of their joint zones into interlocking engagement through the operation of fastening the plates together.

In testimony whereof, I have hereunto signed my name at Philadelphia, Pennsylvania, this 19th day of July, 1920.

ARTHUR R. EARNSHAW.

Witnesses:
JAMES H. BELL,
F. L. FULLERTON.